Patented Aug. 27, 1946

2,406,580

UNITED STATES PATENT OFFICE 2,406,580

OPTICAL GLASSES

Raymond Edward Bastick, Wilfred Marsh Hampton, and Ta-Hang Wang, Smethwick, Birmingham, England, assignors to Chance Brothers Limited, Smethwick, Birmingham, England No Drawing. Application January 2, 1945, Serial No. 571,106. In Great Britain November 11, 1943

8 Claims. (Cl. 106—53)

This invention relates to optical glasses and particularly glasses required for photographic lenses.

The invention comprises glasses having the following essential constituents and within the range of proportions specified, namely:

| | Per cent |
|---|---|
| Silica ($SiO_2$) | 10–25 |
| Barium oxide (BaO) | 15–35 |
| Boron oxide ($B_2O_3$) | 10–30 |
| Lanthanum oxide ($La_2O_3$) | 8–20 |
| Thorium oxide ($ThO_2$) | 3–15 |
| Zinc oxide (ZnO) | 2–8 | the amounts of lanthanum and thorium oxides together being not more than 35% of the total glass composition.

There may also be added lead oxide, and/or other oxides of the alkaline earths, provided that the amount of barium and other alkaline earth oxides together with the zinc and lead oxides do not exceed 45% of the total glass composition.

Further we may add oxides of zirconium, and/or aluminium and/or beryllium to minimise the tendency of the glass to crystallisation, the amounts of such constituents being indicated by the following examples.

The refractive index $nd$, and Abbé constant $v$, of glasses embodying the present invention satisfy the relationship:

$$nd > 1.746 - 0.0021v,$$

where $v$ has a value lying between 47 and 60.

The following table gives particulars of typical glasses made in accordance with the invention:

| Constituents | A | B | C | D | E |
|---|---|---|---|---|---|
| | Per cent | Per cent | Per cent | Per cent | Per cent |
| $SiO_2$ | 15.0 | 10.3 | 20.0 | 14.0 | 10.3 |
| BaO | 31.3 | 24.2 | 36.0 | 22.0 | 26.9 |
| $B_2O_3$ | 15.4 | 21.8 | 24.0 | 25.0 | 24.8 |
| $ThO_2$ | 11.3 | 13.4 | 3.5 | 12.0 | 13.5 |
| $La_2O_3$ | 13.0 | 17.3 | 14.0 | 17.0 | 18.4 |
| ZnO | 2.5 | 5.0 | 2.0 | 4.0 | 4.0 |
| PbO | 9.0 | 3.0 | | | |
| $ZrO_2$ | 2.5 | 5.0 | | | 2.1 |
| $Al_2O_3$ | | | 0.5 | 3.0 | |
| BeO | | | | 3.0 | |
| $nd$ | 1.717 | 1.709 | 1.645 | 1.654 | 1.691 |
| $v$ | 47.7 | 50.8 | 58.8 | 57.1 | 54.8 |

In the manufacture of glasses in accordance with the invention it is important that the constituents should be melted in crucibles made from a material which is inert to any of the constituents, platinum crucibles being preferable.

Having thus described our invention what we claim as new and desire to secure by Letters Patent is:

1. Optical glasses having the following essential constituents and within the range of proportions specified, namely:

| | Per cent |
|---|---|
| Silica ($SiO_2$) | 10–25 |
| Barium oxide (BaO) | 15–35 |
| Boron oxide ($B_2O_3$) | 10–30 |
| Lanthanum oxide ($La_2O_3$) | 8–20 |
| Thorium oxide ($ThO_2$) | 3–15 |
| Zinc oxide (ZnO) | 2–8 | the amounts of lanthanum and thorium oxides together being not more than 35% of the total glass composition.

2. Optical glasses as claimed in claim 1 and containing also lead oxide, provided that the amount of barium oxide together with the zinc and lead oxides do not exceed 45% of the total glass composition.

3. Optical glasses as claimed in claim 1 and containing also other oxides of the alkaline earths, provided that the amount of barium oxide and other alkaline earths together with the zinc oxide do not exceed 45% of the total glass composition.

4. Optical glasses as claimed in claim 1 and containing also lead oxide, and other oxides of the alkaline earths, provided that the amount of barium oxide and other alkaline earths together with the zinc and lead oxides do not exceed 45% of the total glass composition.

5. Optical glasses as claimed in claim 1 and containing also at least one of the oxides of zirconium, aluminium, and beryllium for the purpose specified.

6. An optical glass having the following composition: 15.0% of $SiO_2$, 31.3% of BaO, 15.4% of $B_2O_3$, 11.3% of $ThO_2$, 13.0% of $La_2O_3$, 2.5% of ZnO, 9.0% of PbO, 2.5% of $ZrO_2$, and having a refractive index of 1.717 and an Abbé constant of 47.7.

7. An optical glass having the following composition: 10.3% of $SiO_2$, 24.2% of BaO, 21.8% of $B_2O_3$, 13.4% of $ThO_2$, 17.3% of $La_2O_3$, 5.0% of ZnO, 3.0% of PbO, 5.0% of $ZrO_2$, and having a refractive index of 1.709 and an Abbé constant of 50.8.

8. An optical glass having the following composition: 20.0% of $SiO_2$, 36.0% of BaO, 24.0% of $B_2O_3$, 3.5% of $ThO_2$, 14.0% of $La_2O_3$, 2.0% of ZnO, 0.5% of $Al_2O_3$, and having a refractive index of 1.645 and an Abbé constant of 58.8.

RAYMOND EDWARD BASTICK.
WILFRED MARSH HAMPTON.
TA-HANG WANG.